(12) United States Patent
Sohda et al.

(10) Patent No.: US 6,654,082 B1
(45) Date of Patent: Nov. 25, 2003

(54) LIQUID CRYSTAL DISPLAY ELEMENT AND COLOR DISPLAY DEVICE HAVING PARTICULAR TRANSFLECTOR

(75) Inventors: Yuji Sohda, Tokyo (JP); Yoshinori Hirai, Kanagawa (JP); Masao Ozeki, Kanagawa (JP); Toshihiko Suzuki, Kanagawa (JP)

(73) Assignee: Optrex Corporation, Tokyo (JP)

( * ) Notice: Subject to any disclaimer, the term of this patent is extended or adjusted under 35 U.S.C. 154(b) by 0 days.

(21) Appl. No.: 09/396,887

(22) Filed: Sep. 16, 1999

(30) Foreign Application Priority Data

Sep. 16, 1998 (JP) ............................. 10-261986
May 18, 1999 (JP) ............................. 11-137232

(51) Int. Cl.[7] ..................... G02F 1/1335; G02F 1/1333
(52) U.S. Cl. ..................... 349/106; 349/62; 349/110; 349/114
(58) Field of Search ................. 349/106, 110, 349/62, 114

(56) References Cited

U.S. PATENT DOCUMENTS 6,043,857 A * 3/2000 Kurauchi et al. ........... 349/106
6,064,454 A * 5/2000 Kim et al. .................. 349/110
6,067,136 A * 5/2000 Yamaguchi et al. ......... 349/96
6,130,736 A * 10/2000 Ssaki et al. ................ 349/122
6,154,264 A * 11/2000 Koide et al. ............... 349/113
6,181,309 B1 * 1/2001 Mori et al. .................. 345/88
6,221,543 B1 * 4/2001 Guehler et al. ............... 430/7
6,238,827 B1 * 5/2001 Nakazawa et al. ............ 430/7
6,271,902 B1 * 8/2001 Ogura et al. ................ 349/106
6,310,672 B1 * 10/2001 Koike et al. ................ 349/106
6,317,181 B1 * 11/2001 Hoshino ...................... 349/98
6,344,887 B1 * 2/2002 Ma et al. ..................... 349/98
6,373,538 B2 * 4/2002 Okumura et al. ........... 349/106

FOREIGN PATENT DOCUMENTS

JP        10-133165        * 5/1998

* cited by examiner

Primary Examiner—Toan Ton
Assistant Examiner—Mike Qi
(74) Attorney, Agent, or Firm—Oblon, Spivak, McClelland, Maier & Neustadt, P.C.

(57) ABSTRACT

A liquid crystal display element comprising a color filter having a plurality of colored portions each having a different spectral color and a reflector wherein the color filter is so adapted that transmitted light from the standard C light source is substantially achromatic and the transmittance of visible light by the standard C light source is 30–65%.

11 Claims, 9 Drawing Sheets

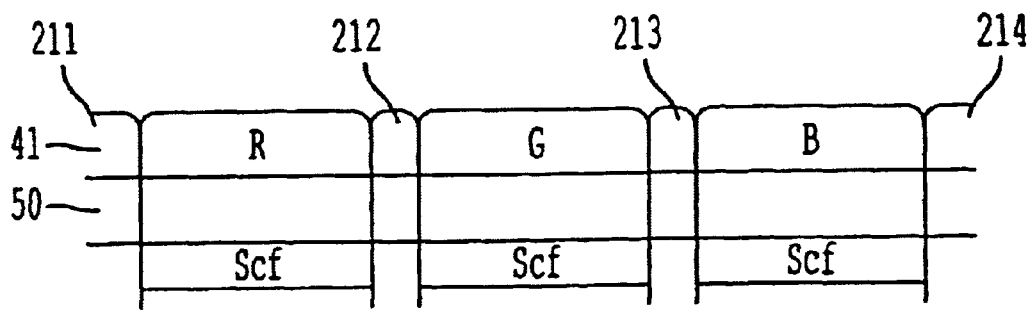
FIG. 11
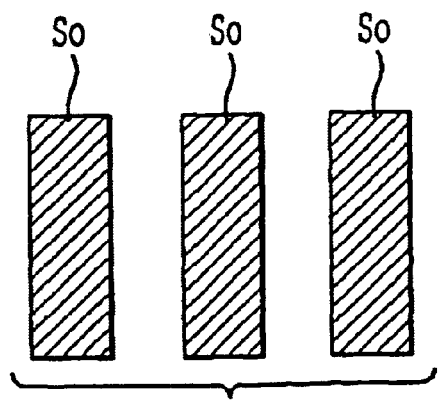
FIG. 12A
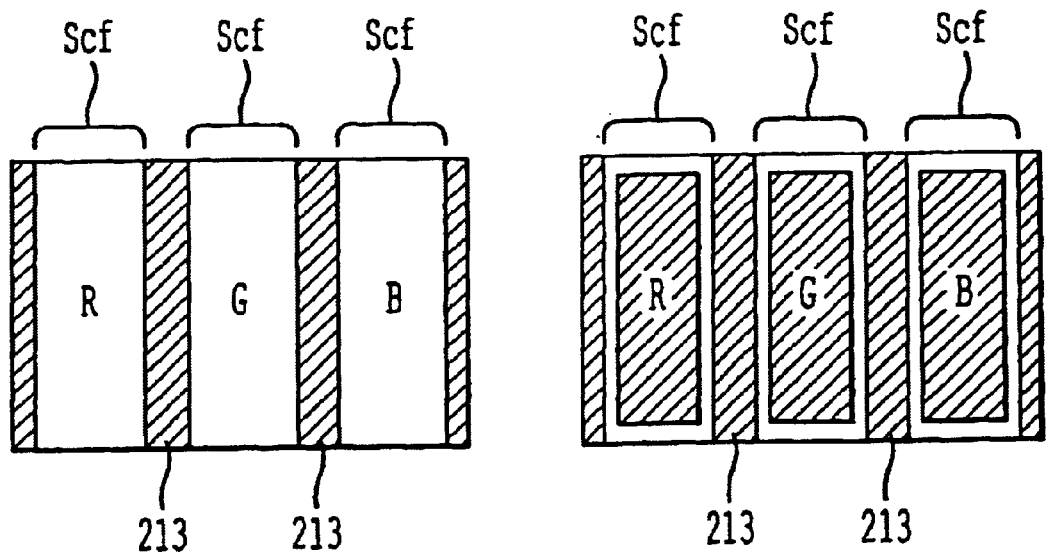
FIG. 12B      FIG. 12C

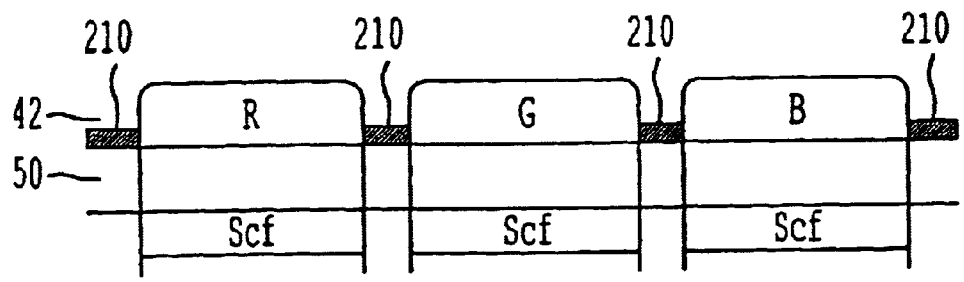
FIG. 13
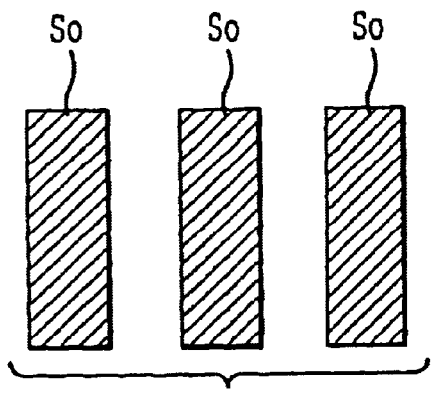
FIG. 14A
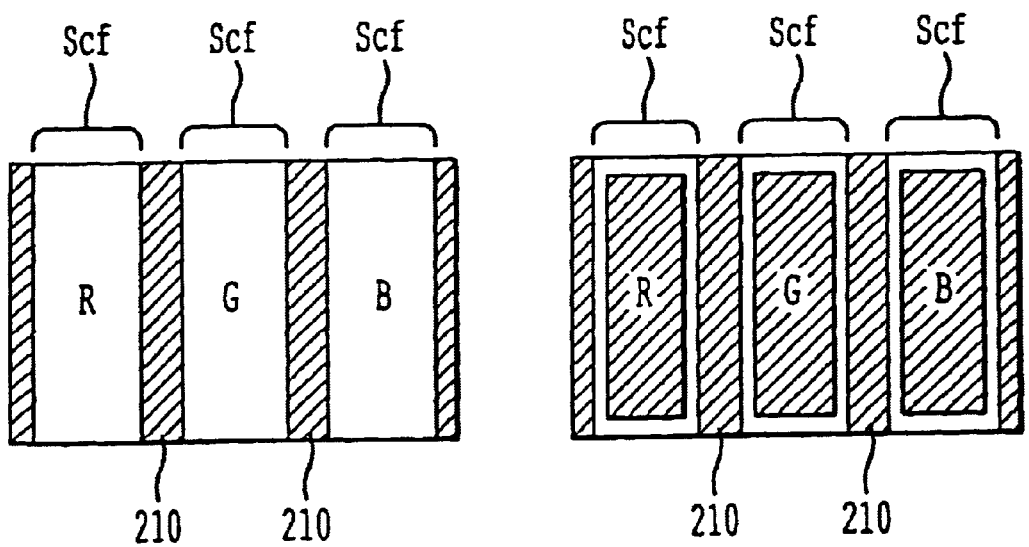
FIG. 14B              FIG. 14C

LIQUID CRYSTAL DISPLAY ELEMENT AND COLOR DISPLAY DEVICE HAVING PARTICULAR TRANSFLECTOR

BACKGROUND OF THE INVENTION

1. Field of the Invention

The present invention relates to a liquid crystal display element applicable to a reflective type or a transflective type liquid crystal display, a method for producing the liquid crystal display element and a color display device.

2. Discussion of the Background

A liquid crystal display element has widely been used for a portable information device or the like because it is thin and light in weight. As such liquid crystal display element widely used, there are an active matrix liquid crystal display element using active elements such as thin-film transistors and a STN liquid crystal element as a simple matrix type liquid crystal display element which responds an effective value of voltage. Use of the active matrix liquid crystal element is currently in a main stream because it exhibits a high display performance. However, it is unsuitable for such a field of use that a variety of design or custom-made articles are required, because manufacturing steps are complicated and expensive and a plurality of masks are required for manufacturing a kind of display apparatus. Accordingly, the simple matrix type liquid crystal display device is often used in such field of use.

A liquid crystal display element assembled to an information system is often required to have a color display from the viewpoints that a display is easy to see and has a large amount of information to be displayed.

In order to realize a color display, a system in which a color filter is provided in a liquid crystal display cell is used. However, in the liquid crystal display element provided with a color filter, the transmittance of light is decreased due to the color filter, and when an additive color mixture method is used, it is necessary to divide a single pixel into three portions for three basic colors of red, green and blue (R, G, B) with the result that the numerical aperture decreases substantially.

For instance, the brightness of red in displaying red is expressed by (the transmittance of liquid crystal×the transmittance of a red color filter×numerical aperture/3). However, an obtainable value does not reach 3% of light entering into the liquid crystal cell. Therefore, a light source such as a backlight is provided at a position such as a rear face of the liquid crystal display element to form a transmission type liquid crystal display device. Further, for assurance of an attractive display in such construction, it is necessary to operate the light source all the time.

The characteristics required for the color display device used for a portable information device reside in the following two points: (a) a color display of multi-gray shades of almost the full colors can be provided regardless of a change of the lightness of the surroundings and (b) power consumption is low.

In the transmission type color liquid crystal display device used widely for a book type personal computer at the present time, the brightness of about 100 $cd/cm^2$, which is an appropriate lightness in an ordinary office environment, is standard. However, the portable information device is nowadays used under various environments such as a large meeting room (which has a fixed illumination and a user's desire is not often satisfied), the outdoors, at night and so on.

On the other hand, since the visual performance of human is generally adaptable to an illuminance of outer light, there exists the optimum brightness of an object to be observed in response to the illuminance of an outer light.

For example, the illuminance of an outer light is about several ten luxes under a dark environment, and a human vision is adaptable to darkness. In this case, when the brightness of an object to be observed is too light, a stimulation to the optic nerve is strong and the observer feels fairly fatigue. Accordingly, the brightness of the backlight should be decreased to about several $cd/m^2$-50 $cd/m^2$. Further, under an environment of a high illuminance such as the outdoors in a fine weather, the illuminance of an outer light exceeds 20,000 luxes, and accordingly, a human vision is adaptable to lightness. In this case, when the brightness of an object to be observed is too dark, visibility to a display remarkably decreases. Therefore, the brightness of the backlight should be as high as about several hundred-1,000 $cd/m^2$.

Accordingly, in order to allow the use of it in any environment, it is necessary to achieve the highest brightness of not less than several hundred $cd/m^2$ and to conduct a brightness control of 100:1 or more.

In conducting such brightness control, a large amount of consumption power and an accessory circuit are needed. In short, the transmission type color display device belonging to the conventional technique is not suitable for portable information devices from either the viewpoint of consumption power or the viewpoint of an increased number of elements for the accessory circuit.

On the other hand, since the portable information devices are generally of a type of battery-driven, there is a demand of lowering an amount of power to be consumed in order to prolong a driving time. Therefore, there is proposed, for the portable information devices, to use a reflective type color liquid crystal display device without using a backlight while an amount of power to be consumed can substantially be reduced.

In the reflective color liquid crystal display device, however, there is a problem that the brightness is very low because it does not have a backlight and both an incident light and a reflected light are passed through the color filter.

Namely, in the conventional reflective type color display device without having an auxiliary light source, although visibility to a display can sufficiently be assured under an environment of a high illuminance such as the outdoors in a fine weather, it is almost impossible to recognize a display under an environment of darkness. Accordingly, it is difficult to use the reflective type display device under such a change of environment.

Further, the transmission type liquid crystal display device generally uses a cold cathode ray tube as a backlight. Accordingly, the color filter is generally so designed as to utilize sufficiently light from the cold cathode ray tube. However, when light from a light source other than the cold cathode ray tube is passed through such color filter, an achromatic color can not be obtained at the time of mixing colors, and good color development cannot be obtained. For example, under a daylight condition, a color obtainable by the color filter at the time of mixing colors is yellowish green.

Further, JP-A-7-28010 and JP-A-8-179125 disclose a liquid crystal display element using a transflector.

However, the inventors of this application has revealed through their studies that even though the construction of the conventional transmission type display device is simply changed according to specifications for a transflective type, a sufficient performance of display can not be obtained.

It is an object of the present invention to provide a liquid crystal display element which can be used under various environments while a good color-developing performance is maintained, a method for producing the liquid crystal display element and a color display device.

SUMMARY OF THE INVENTION

In accordance with the present invention, there is provided a liquid crystal display element comprising a color filter having a plurality of colored portions each having a different spectral color and a reflector, wherein the color filter is so adapted that transmitted light from a standard C light source is substantially achromatic and the transmittance of visible light by the standard C light source is 30–65%.

Further, there is provided the above-mentioned liquid crystal display element wherein a colored portion having a spectral color of the color filter is formed to cover a pixel of a driving aperture, which corresponds to the colored portion having a spectral color of the color filter.

Further, there is provided a color display device comprising a display element having a color filter, a backlight and a transflector disposed between the display element and the backlight wherein the transmittance of visible light by a standard C light source, of the filter is 30–65%, and the transmittance T(%) and the reflectance R(%) of the transflector satisfy Formula 1:

$$T/(T+R) \leq 0.4. \ldots \quad \text{Formula 1}$$

The liquid crystal display element of the present invention is provided with a reflector. The reflector may be a transflector. In the present invention, "transflection" means "semi-transmission and semi-reflection" and therefore, the transflector, as a single member, possesses both a light transmitting property and a light reflecting property.

In the present invention, there is obtainable a liquid crystal display element which provides easy observation for a display under various environments by utilizing efficiently an outer light.

Further, in the color filter used for the present invention, transmitted light from a standard C light source is substantially achromatic. Here, "substantially achromatic" implies that chromaticity coordinates x and y obtainable after light from the standard C light source has transmitted through the color filter, are in a range of white on a chromaticity diagram (mainly in a range of generally elliptic shape of [x=0.27, y=0.27]–[x=0.37, y=0.37]) shown in a reference Figure in JIS Z8110.

With such measures, the features of the reflective type display element utilizing efficiently an outer light can be taken while a good color-developing performance is obtainable.

Generally, a color filter used for a display device which effects a color display of nearly full colors, is provided with a plurality of color portions each having a different spectral color. In this case, "transmitted light of a color filter" implies the transmitted light, in the whole color filter, resulted when the colored portions having a spectral color respectively produce color lights and the color lights are mixed.

When the transflector is used for the color display device of the present invention, a color tone of the color filter may be determined in consideration of a color tone of the backlight so that chromaticity coordinates x and y of light obtained after light from the standard C light source has passed through the color filter are deviated from the above-mentioned range of white.

In this case, however, since a transflector having a relatively high reflectance in comparison with the transmittance in the present invention is used, an outer light contributes largely to the brightness of a display. Accordingly, in fact, it is preferable that the chromaticity coordinates x, y of light after light from the standard C light source has passed through the color filter are within the above-mentioned range of white (transmitted light from the standard C light source is substantially achromatic).

Further, in the present invention, the transmittance of visible light by the standard C light source through the color filter is to be 30–65%, particularly, 30–55%. Since the color filter of the present invention has a relatively high visible light transmittance. Accordingly, when it is used for a reflective type liquid crystal display element, an outer light can sufficiently be utilized for a display.

Further, in the present invention, it is preferable that any of the colored portions having a spectral color of the color filter is formed to cover a pixel of a driving aperture wherein the pixel corresponds to a color portion having a spectral color of the color filter. Here, the pixel of the driving aperture means a portion in which a column electrode and a row electrode, which are arranged in a matrix form, overlap.

With such measures, the all area of the driving aperture is usable for transmission of light whereby a degree of utilization of an outer light is improved and brightness in a display device can be improved.

The colored portions having each a spectral color to form the color filter can be positioned in three ways as follows. Namely, color portions each having a spectral color for constituting the color filter are arranged to adjoin without any gap; there is a mixed color portion between adjacent colored portions each having a spectral color for constituting the color filter, and there is a black mask between adjacent colored portions each having a spectral color for constituting the color filter.

In a case that a colored portion having a spectral color of the color filter is formed to cover a pixel of a driving aperture, wherein the pixel corresponds to the color portion having a spectral color of the color filter, it is preferable to form a liquid crystal display element in a mode of transmitting light at the application of a voltage (i.e., a normally black mode). It is because the mode of transmitting light at the application of a voltage can suppress leakage of light from an area other than pixels at the time of interruption of light, in comparison with a mode of interrupting light at the time of the application of voltage (i.e., a normally white mode).

Further, in the present invention, when the transflector is used so that both a display performance obtained by transmitted light and a display performance obtained by reflected light of an outer light can be obtained, it is preferable that the transmittance T(%) and the reflectance R(%) of the transflector satisfy the above-mentioned Formula 1. With such measures, a display by transmitted light and a display by reflected light can be used in balance whereby a display adaptable naturally to a change of environment can be obtained. Here, "a display by transmitted light" means a display obtained by utilizing a backlight attached as an accessory to a color liquid crystal display device, and "a display by reflected light" means a display effected by utilizing an outer light.

Description will be made as to conditions of Formula 1.

In the transflector, as the reflectance is higher, a display which utilizes mainly reflected light is presented while a loss in the operation of the backlight is large. On the other hand, when the reflectance is low, a degree of utilization of an outer light is low.

In order to improve a color tone in utilizing transmitted light, the color purity of the color filter is usually increased as a result of which a structure of lowering the transmittance is used. However, such structure is unsuitable for a display using reflected light. Further, transmitted light takes a route in which the light passes once from a backside where the backlight is disposed to a front side. However, reflected light takes a route in which the light is incident from a front side, passes through the inside of the display device, is reflected by the transflector, and passes again through the inside of the display device, i.e., the light passes twice (reference to FIG. 18). Accordingly, the optimum condition of the color filter is different between the transmitted light and the reflected light.

Generally, a reflectance of transflector is expressed by $R(\%)$, a transmittance of transflector is expressed by $T(\%)$ and a transmittance of visible light by a standard C light source through a color filter is expressed by $Y(\%)$. Further, when a brightness of backlight is expressed by $\alpha(cd/r^2)$, an illuminance of outer light irradiated onto a surface of an object to be observed is expressed by $\beta(Lx)$, a directivity of light source is expressed by $LS_n$, and a directivity of reflective member is expressed by $R_n$, a brightness of display is given by the following Formula 2:

$$\alpha \cdot (T/100) \cdot (Y/100) \cdot C_1 + \beta (LS_n) \cdot R_n \cdot (R/100) \cdot (Y/100)^2 \cdot C_2 (cd/m^2) \qquad \text{Formula 2}$$

where $LS_n$ and $R_n$ as directivity indication coefficients are respectively values corresponding to n obtained when brightness distributions of a diffusion characteristic and a reflection-diffusion characteristic are expressed in terms of $\cos^n(\theta)$, and they take a range of $1<n<\infty$. When n=1, there is no directivity which expresses perfect diffusion and perfect diffusion-reflection characteristics. Further, when $n=\infty$, they show the strongest directivity which expresses perfect collimate light and perfect mirror-surface-reflection characteristics.

Further, $C_1$ represents practically the maximum transmittance of liquid crystal and $C_2$ represents practically the maximum transmittance of liquid crystal in consideration of the directivity of reflected light. Further, T and R are relative values wherein $T+R \leq 100\%$.

From this Formula, the characteristics of display by T, R and Y are largely classified into the following (A) to (D).

(A) When T=large, R=small and Y=small, a display by transmitted light is attractive and a degree of utilization of the backlight is high. However, a degree of utilization of an outer light is low.

(B) When T=large, R=small and Y=large, a display by mainly transmitted light is obtainable, however, the chromaticity is poor. A degree of utilization of reflected light is intermediate.

(C) When T=small, R=large and Y=small, a display by transmitted light is not attractive, and a degree of utilization of the backlight is low. A degree of utilization of an outer light is intermediate.

(D) When T=small, R=large and Y=large, a display by reflected light is intermediate, and a degree of utilization of the backlight is intermediate. A degree of utilization of an outer light is high.

According to the knowledge of the inventors, in a transflective type liquid crystal display element, a lightness required by transmitted light with use of the backlight is fairly smaller than that of a case of using a transmission type display device, and a brightness of ⅓ or lower is sufficient in comparison with a numerical value of 100 cd/m² in a standardized use of a note type personal computer. Since a component of reflected light of an outer light can be utilized even in an ordinary environment of room, there is little problem in suppressing lightness obtained by transmitted light.

On the other hand, as described before, it is preferable that the transmittance of the color filter is relatively large in order to increase the brightness of a display by reflected light. From the above, in the transflective type display device, it is preferable to satisfy each relation as in formula 3 and formula 4.

$$T/(T+R) \leq 0.4 \qquad \text{Formula 3}$$

$$30 \leq Y < 65 \qquad \text{Formula 4}$$

As to Y, it is preferable to satisfy a relation in Formula 5.

$$30 < Y < 55 \qquad \text{Formula 5}$$

Further, it is in particular preferable to satisfy conditions as in Formula 6 and Formula 7.

$$T/(T+R) \leq 0.35 \qquad \text{Formula 6}$$

$$35 < Y < 50 \qquad \text{Formula 7}$$

Further, in order to sufficiently make use of the characteristics of the transflective type, it is preferable that $T/(T+R)$ is 0.05 or more. In order to obtain good visibility in any environment, it is most preferable that $T/(T+R)$ is 0.15 or less.

When these conditions are satisfied, a display in response to a change of environment can be obtained, and at the same time, a display of lower power consumption rate than the conventional transmission type is possible. For instance, an example that a transmission type display device of 100 cd/m² is modified to a transflective type according to the above-mentioned way of thinking wherein the lightness at the time of transmitting light is 10c/m², is taken.

In this case, when it is estimated that Y=45%, T=30%, R=70% and the ratio of consumption power by the backlight in the transmission type is 90%, the consumption power can be reduced to 70% in comparison with the transmission type. This means that the color liquid crystal display device of the present invention can achieve in good balance a response to a change of environment and the requirement for reducing consumption power.

In this viewpoint, a component of transmitted light and a component of reflected light are balanced, and a brightness by transmitted light is brought to such a condition that consumption power can be minimized in a case of a minimum necessary brightness in an environment of use.

For example, it is preferable that the brightness by transmitted light is 50 cd/m² or less in the application of the display device to a personal information device.

Further, it is further preferable to be 30 cd/m² or less.

Further, since a higher visibility is required for usage such as a car-mounted type, the brightness by transmitted light should be 120 cd/m² or less. Further, as a further preferable condition, 80 cd/m² or less is exemplified. Even in these examples, the brightness is about ⅓ as much as the conventional transmission type, and a requirement of lower consumption power can be met.

A desired member can be used as to the directivity of reflected light. However, when a transflector is used, it is preferable to use such reflector having a certain degree of directivity. As luminous intensity distribution characteristics at the time of reflection, a gain of 1.5–10 is a preferred range. At the same time, it is preferable to use a backlight having substantially the same directivity.

BRIEF DESCRIPTION OF DRAWINGS

FIG. 11 is a cross-sectional view showing the structure of another embodiment of the color filter;

FIG. 12A is a plan view showing a driving aperture;

FIG. 12B is a plan view of a color filter 41 viewed from an upper side;

FIG. 12C is a plan view showing how the driving aperture and the color filter 41 overlap.

FIG. 13 is a cross-sectional view showing the structure of another embodiment of the color filter;

FIG. 14A is a plan view showing a driving aperture;

FIG. 14B is a plan view of another embodiment of the color filter 41 viewed from an upper side;

FIG. 14C is a plan view showing how the driving aperture and the color filter 41 overlap.

DESCRIPTION OF PREFERRED EMBODIMENTS

In the following, several embodiments of the present invention will be described with reference to the drawings.

Figure 1:
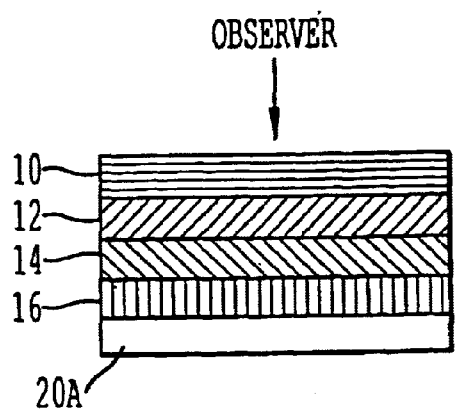
FIG. 1 is a cross-sectional view showing the structure of an example of the liquid crystal display element according to the present invention.

FIG. 1 is a cross-sectional view showing an embodiment of the liquid crystal display element according to the present invention. As shown in FIG. 1, in this embodiment, the liquid crystal display element has a structure formed by laminating a polarizer 10 for changing incident light to a linearly polarized light, retardation plates 12, 14 for effecting color compensation to render display colors to be achromatic (monochromatic), a scattering film 16 for scattering reflected light and a liquid crystal panel 20A in view from an observer side.

Figure 2:
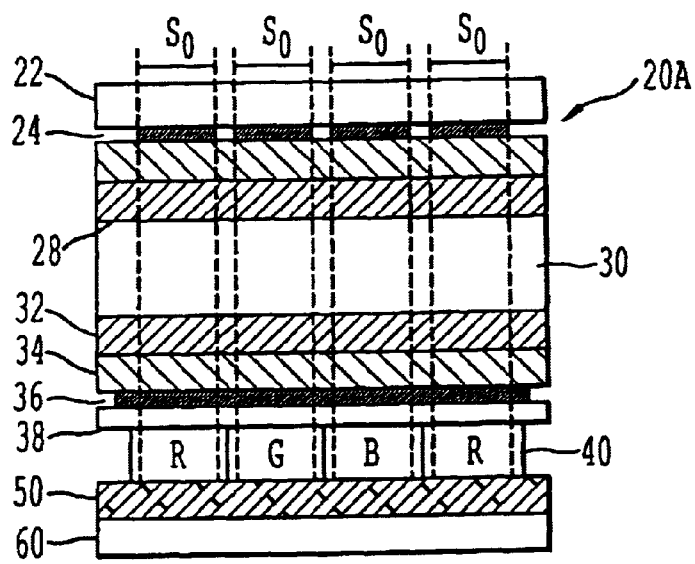
FIG. 2 is a cross-sectional view showing the structure of a liquid crystal panel.

FIG. 2 is a cross-sectional view showing the structure of the liquid crystal panel 20A. As shown in FIG. 2, the liquid crystal panel 20A has a structure laminated with an upper glass substrate 22, an upper electrode layer 24 in which stripe-like electrodes are arranged, an insulation layer 26, an upper alignment layer 28, a liquid crystal layer 30 filled between the alignment layer 28 and a lower alignment layer 32, a lower insulation layer 34 disposed below the alignment layer 32, a lower electrode layer 36 in which electrodes are arranged in a direction perpendicular to the stripe-like electrodes of the electrode layer 24, a smoothing layer 38 for smoothing an upper portion of color filter, a color filter 40, a reflector 50 and a lower glass substrate 60. Spacers (not shown) are provided in the liquid crystal layer 30 so as to keep the height (gap) of the liquid crystal layer constant.

As the reflector 50, a reflection layer formed of a metallic layer such as Al, Ag or the like formed on the glass substrate 60 is exemplified. From the viewpoints of the prevention of deterioration and enhancement of reflection, an electric interfering film such as $SiO_2$ or $TiO_2$ or the like may be formed on its front surface. Further, in this embodiment, an antireflection coating and an antiglare coating (not shown) are provided to prevent a regular reflection of an outer light.

In FIG. 2, $S_O$ indicates a portion in which an upper stripe electrode and a lower stripe electrode overlap in view from an observer side, i.e., it indicates the surface area of a pixel in a driving aperture.

Further, as shown in FIG. 2, when the liquid crystal cell (including the alignment layer 28, the liquid crystal layer 30 and the alignment layer 32), the color filter 40, the reflector 50 and the glass substrate 60 are laminated in this order in view from an observer side, the color filter 40 and the reflector 50 which are relatively weak to heat can be gathered to a one side of the substrates. An electrode at one side between two substrates is required to be connected to a driving IC by means of soldering or thermocompression bonding through an anisotropic conductive film. However, such lamination structure allows to connect a driving IC to an electrode at a side of substrate where the color filter 40 and the reflector 50 are not provided. As a result, the color filter 40 and the reflector 50 can be prevented from suffering a high temperature during the manufacture, and the quality of manufactured products is improved.

Further, when the color filter 40 is laminated on the reflector 50 as shown in FIG. 2, an insulation layer which is usually used can be omitted, and therefore, manufacturing steps can be simplified.

Figure 3:
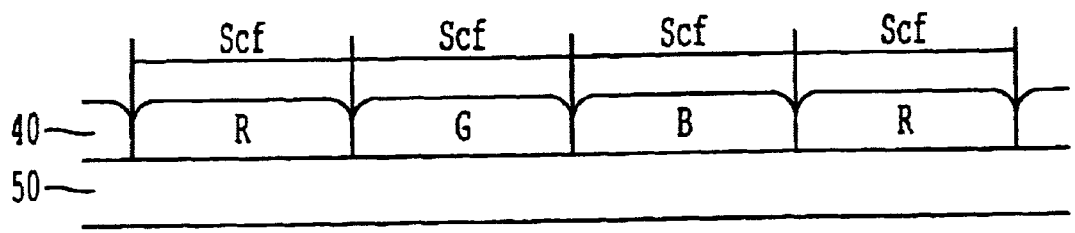
FIG. 3 is a cross-sectional view showing the structure of a color filter.

FIG. 3 is a cross-sectional view showing the structure of the color filter 40 in the liquid crystal panel. In FIG. 3, colored portions of R, G and B adjoin without any gap therebetween as shown in FIG. 3. In FIG. 3, a color portion having a spectral color of the color filter is formed to cover a pixel of a driving aperture wherein the pixel corresponds to the colored portion having a spectral color of the color filter. $S_{cf}$ indicates the surface area of a colored portion having a spectral color in the color filter 40 wherein the colored portion corresponds to a pixel of the driving aperture, and in this case, $S_{cf} \geq S_o$. The surface area $S_o$ of a pixel of the driving aperture is preferably to be large in a range of $S_{cf} \geq S_o$. For example, it should be not less than 84% to $S_{cf}$.

The color filter 40 is preferably formed by an electrodeposition method, but not by a pigment dispersing method which has been widely used. It is because the pigment dispersing method may produce a non-colored portion due to inaccuracy of alignment.

The reflector 50 of this embodiment can be a transflector. In this case, a backlight can be provided at a rear side of the reflector. In the transflector, the transmittance T(%) and the reflectance R(%) should satisfy the before-mentioned Formula 1.

Further, it is possible to use the reflector as an electrode layer. However, an electrode has to be drawn out of the cell. In such structure, the reflector is drawn out of the cell, and accordingly, there may cause a problem of reliability on the reflector. Therefore, the reflector is not used as an electrode layer in this embodiment. However, the reflector may be extended to an intermediate of the sealing portion to widen the surface area of the reflector.

The color purity of the color filter 40 is determined to be lower than the color purity of a color filter used in a transmission type liquid crystal display panel. A color purity and a light transmittance are in a relation of trade-off. Accordingly, the transmittance of light of the color filter 40 is improved by lowering the color purity. The color filter 40 is so designed that transmitted light from a standard C light source is substantially achromatic. Further, the transmittance of visual light from the standard C light source through the color filter 40 is 53%.

A color filter of a visible light transmittance of 61% may be used to increase the lightness by reflected light whereby a light display can be obtained. However, the color purity decreases in comparison with that of 53%.

Figure 4:
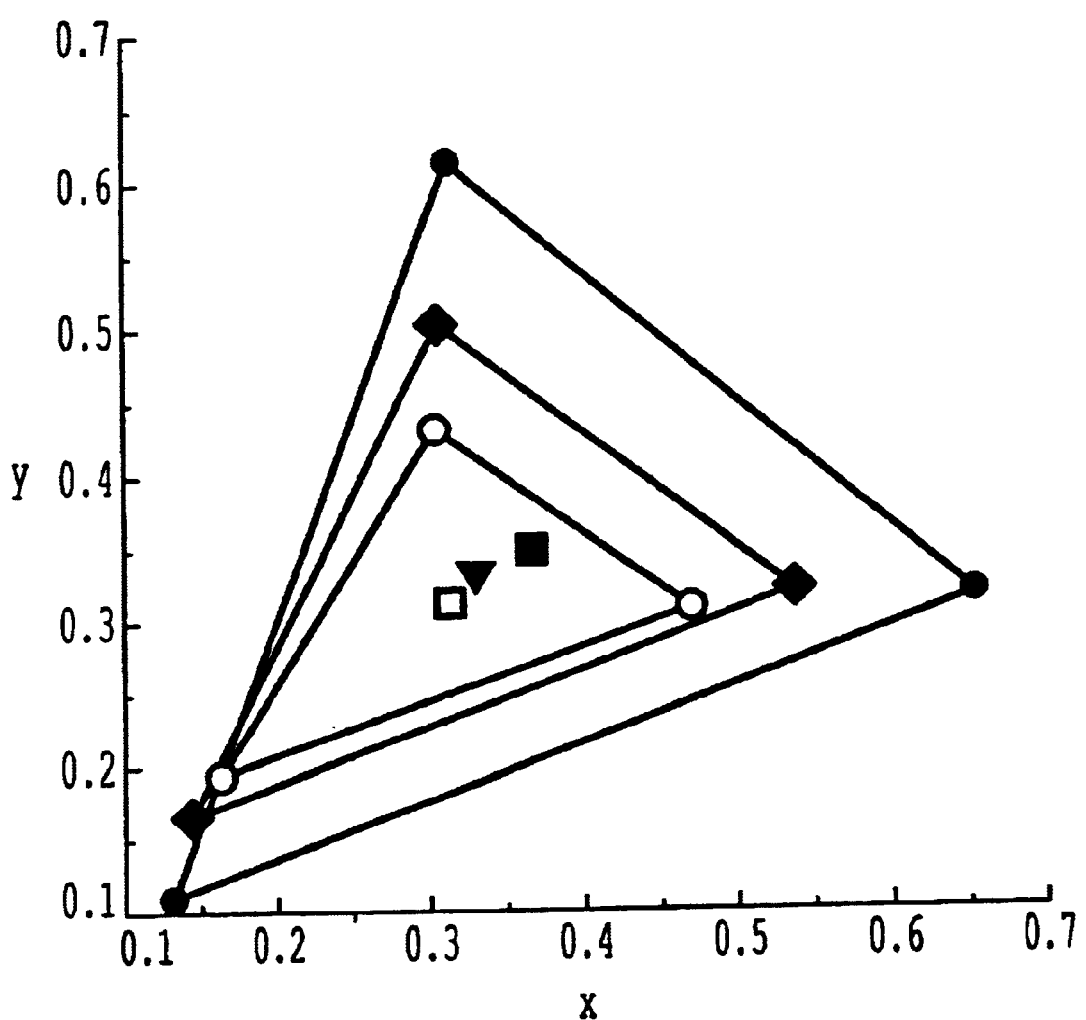
FIG. 4 is a diagram showing color reproducibility by the color filter on an x–y chromaticity diagram.

FIG. 4 is a diagram showing color reproducibility by a color filter used for a conventional transmission type liquid crystal display panel and color reproducibility by the color filter 40 of this embodiment on an x–y chromaticity diagram. In examining color reproducibility by reflected light, data are shown in terms of the square of a transmittance. Here, the color reproducibility is measured using a reflective type liquid crystal display element. A triangular region having apexes of ● indicates a color reproducible region by a color filter for a transmission type liquid crystal display element, a triangular region having apexes of ○ indicates a color reproducible region by the color filter 40, and a triangular region having apexes of ♦ indicates a color reproducible region by a color filter for a transflective type liquid crystal display element. Further, ■ indicates a white balance point (namely, a point that when light having this chromaticity coordinates passes the color filter, a white color is presented) of a color filter for a transmission type liquid crystal display element; □ indicates a white balance point of the color filter 40, and ▲ indicates a white balance point of a color filter for a transflective type.

In FIG. 4, the color reproducible region by the color filter 40 is narrower than the color reproducible region by the color filter used for a transmission type liquid crystal display panel because the color purity of the color filter 40 is lower than that of the color filter used for the conventional transmission type liquid crystal display panel. The white balance point by the color filter 40 corresponds substantially to white from a C light source, and transmitted light from a standard C light source is substantially achromatic. It is understood than when the hue of red color in a color filter used for a transmission type liquid crystal display panel is changed, transmitted light from the standard C light source is rendered to be achromatic.

As the liquid crystal display element, a STN element or a TN element (a simple matrix type or an active matrix type)having a twist angle of 180–360° may be used. In particular, it is preferable to use a film compensation type STN element in which at least two retardation films are used.

The color filter is disposed on an inner surface of the display panel at an observer side or a backlight side. As the backlight used, an ordinary one using a fluorescent tube and a light guide plate may be used, or a prism-shaped sheet may additionally be used for directivity control. LED may be used for the fluorescent tube. Further, a plane luminescent element such as an electroluminescence may be used for the backlight depending on usage.

A multiplex line addressing method (MLA method) as disclosed in JP-A-6-27904 may be used for the driving method whereby frame response can be controlled and a display of high speed and high contrast ratio can be conducted.

In the MLA driving method, the scale of a circuit and the inhibition rate of frame response are different depending on the number of lines (L) simultaneously selected. From the viewpoint of the both, a suitable simultaneously selected number is in a range of 2–16 lines, preferably, 2–8 lines.

As the number of lines to be scanned by the MLA driving method, 30 or more.(i.e., 1/30 duty ratio) to not more than 300 is preferred. In this range, a high quality of display and a low power consumption can be achieved with a reduced cost.

Further, a technique of increasing a driving frequency (high frequency driving) can be used to suppress the frame response. In a case of the high frequency driving, the width of a voltage pulse to be applied is narrowed, and accordingly, it is unsuitable for a display having a large surface area and requiring a high resolution. However, in a case that the size of picture area is 10 inches or less and a display density is 1/240 duty ratio or less, the suppression rate of frame response can be increased by increasing a frame frequency.

In this case, the frame frequency (F) for driving liquid crystal is preferably about 120–800 Hz, in particular, 240–500 Hz is suited. Further, in combination of the MLA driving method with the high frequency driving, it is considered that a frame frequency has an effect of about L times. Accordingly, the range of frame frequency should be in a range of the following Formula 8:

$$120 \leq F(Hz) \cdot L \leq 800 (L=1-8) \qquad \text{Formula 8}$$

More preferably, it is in a range of Formula 9:

$$240 \leq F(Hz) \cdot L \leq 500 (L=1-8) \qquad \text{Formula 9}$$

The color filter used in the present invention is of a three color type which is disposed on an inner surface of the cell of the liquid crystal display element, and either a red (R)-green (G)-blue (B) type in an additive color mixture method or a cyan (C)-magenta (M)-yellow (Y) type in a subtractive color mixture method may be used.

As a kind of the color filter, an interference type which utilizes a multilayered film can be used besides a known color filter such as of a pigment dispersion type or a dye type.

It is preferable to use such one that a scattering component of light is low in use, in particular, such one that a back scattering component is low. Although a masking treatment can be conducted to a portion other than pixels such as a black matrix in the color filter, it is preferable for a black mask to use such one that an absorbing material is contained in resin rather than a metallic film in a case of using both "reflected light" and "transmitted light".

It is preferable that a visual angle direction of the liquid crystal panel coincides with the direction of an arrangement of a color filter. Namely, a stripe arrangement is used but not a mosaic arrangement or a delta arrangement so that an arrangement of the same colored portion in view from an observer when the observer views the panel at a correct position is longitudinal direction.

Hereinbelow, examples of the present invention will be described.

EXAMPLE 1

A reflective type liquid crystal display panel of ½ VGA size having 640×240 RGB pixels was prepared with use of a liquid crystal element having the construction as shown in FIGS. 1 to 3. With use of the liquid crystal panel, evaluation was conducted as to whether a display is easy to see. A STN element of a twist angle of 240° was used for the liquid crystal element. The type of liquid crystal was of a normally black mode.

Relations of each member are as follows. An angle in a clockwise direction from an absorbing axis of the polarizer 10 to a retardation axis of the retardation plate 12 is 110° and an angle in a clockwise direction from the retardation axis of the retardation plate 12 to a retardation axis of the retardation plate 14 is 35°. Further, an angle in a clockwise direction from the retardation axis of the retardation plate 14 to an alignment direction in an upper face of the liquid crystal cell (including the alignment layer 28, the liquid crystal layer 30 and the alignment layer 32) is 110°. An angle in a counterclockwise direction from the alignment direction in the upper face to an alignment direction in a lower face of the liquid crystal cell is 240°.

The retardation values of the retardation plate 12, the retardation plate 14 and the liquid crystal cell were respectively 417 nm, 260 nm and 650 nm.

Table 1 shows a result of evaluation. In Table 1, 20° incidence indicates that parallel light having a strong directivity is incident at an inclination of 20° to a normal line of the panel. 30° incidence indicates that parallel light having a strong directivity is incident at an inclination of 30° to a normal line of the panel. Diffusion light incidence indicates that light is incident from all directions to the panel.

In every case, a state of display was observed from the direction of a normal line of the panel. In Table 1, a color surface area indicates a surface area of a color reproducible region in an isochromatic space (U-V space). Further, lightness is presented by numerical value under the condition that the reflectance of a magnesia oxide material is 100%. In a personal evaluation by an observer, a light attractive display could be obtained even in a either case of parallel light incidence or diffusion light incidence.

EXAMPLE 2

Figure 5:
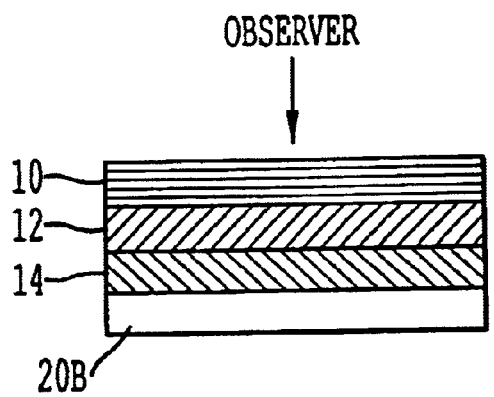
FIG. 5 is a cross-sectional view showing the structure of another embodiment of the liquid crystal display element according to the present invention.
Figure 6:
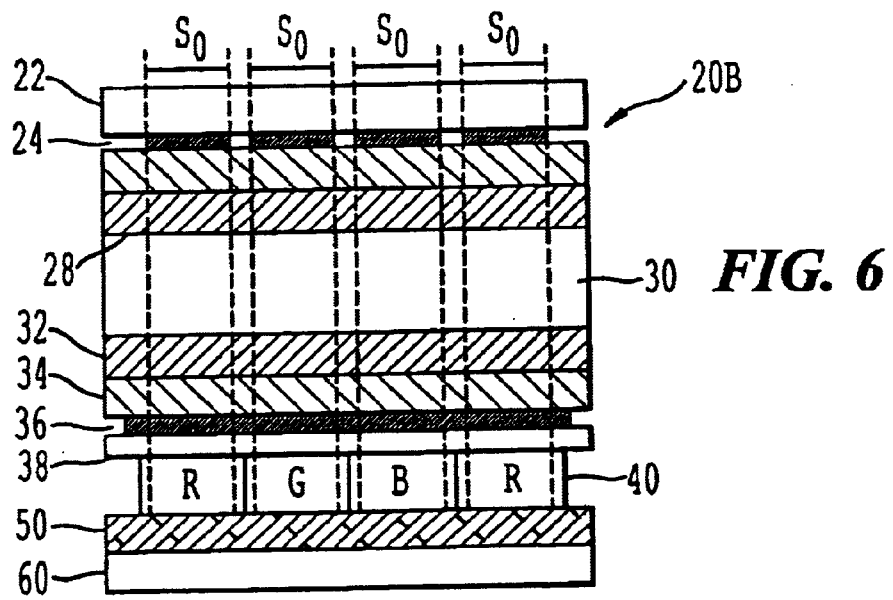
FIG. 6 is a cross-sectional view showing the structure of a liquid crystal panel.

In the liquid crystal display element used in Example 1, a liquid crystal panel in which the diffusion film layer 16 was not provided and a diffusion reflection layer 51 was used instead of the reflector 50 as shown in FIGS. 5 and 6 was used. Namely, the liquid crystal display element in this Example has a structure formed by laminating the polarizer 10, the retardation plates 12, 14 and a liquid crystal panel 12B in view from an observer as shown in FIG. 5.

Further, as shown in FIG. 6, the liquid crystal panel 20B has a structure formed by laminating an upper glass substrate 22, an upper electrode layer 24, an insulation layer 26, an upper alignment layer 28, a liquid crystal layer 30 filled between the alignment layer 28 and a lower alignment layer 32, an insulation layer 34 disposed below the alignment layer 32, a lower electrode layer 36, a smoothing layer 38, a color filter 40, a diffusion reflection layer 51 and a lower glass substrate 60. The color filter 40 has the same structure as that used in Example 1. A lamination of a diffusion layer and a reflecting layer may be used for the diffusion reflection layer 51.

Relations of each member are as follows in the same manner as Example 1. An angle in a clockwise direction from an absorbing axis of the polarizer 10 to a retardation axis of the retardation plate 12 is 110° and an angle in a clockwise direction from the retardation axis of the retardation plate 12 to a retardation axis of the retardation plate 14 is 35°. An angle in a clockwise direction from the retardation axis of the retardation plate 14 to an alignment

TABLE 1

|  |  | Ex. 1 | Ex. 2 | Ex. 3 | Ex. 5 | Comparative Example 1 | |
|---|---|---|---|---|---|---|---|
|  |  |  |  |  |  | Illuminance of outer light 1390 Lx | Illuminance of outer light 8380 Lx |
| 20° Incidence | Contrast | 4.9 | 4.9 | 10.2 | 6.1 | 6.2 | 2.3 |
|  | Color surface area | 0.0048 | 0.0048 | 0.011 | 0.0037 | 0.023 | 0.0047 |
|  | Lightness | 24.8 (%) | 20.8 (%) | 17.5 (%) | 24.1 (%) | 19.0 (%) | 7.6 (%) |
| 30° Incidence | Contrast | 3.7 | 4.0 | 9.0 | 4.9 | 10.4 | 4.5 |
|  | Color surface area | 0.0038 | 0.0041 | 0.010 | 0.0037 | 0.033 | 0.016 |
|  | Lightness | 6.4 (%) | 12.1 (%) | 5.7 (%) | 10.5 (%) | 17.8 (%) | 5.2 (%) |
| Diffusion light incidence | Contrast | 2.6 | 2.3 | 2.1 | 2.9 |  |  |
|  | Color surface area | 0.0020 | 0.0020 | 0.00042 | 0.00057 |  |  |
|  | Lightness | 10.9 (%) | 8.9 (%) | 6.9 (%) | 8.8 (%) |  |  |
| Personal evaluation | Parallel light | ○ | ○ | ⊚ | ○ |  |  |
|  | Diffusion light | ○ | ○ | ○ | ○ |  |  | direction in an upper face of the liquid crystal cell (including the alignment layer 28 the liquid crystal layer 30 and the alignment 32) is 100°. An angle in a counterclockwise direction from the alignment direction of the upper face to an alignment direction in a lower face of the liquid crystal cell is 240°.

The retardation values of the retardation plate 12, the retardation plate 14 and the liquid crystal cell were respectively 417 nm, 260 nm and 650 nm.

Recesses and projections were formed in a front surface of the diffusion reflection layer 51 wherein the shape of recesses and projections was so formed as to have a pitch of 0.3–1.0 μm and a random arrangement of peaks having a height of about 0.1 μm. For a TFT element, recesses having a pitch of several μm and a height of about 1 μm are formed to realize diffusion properties. However, since a severe control of the cell gap is required for a STN element, a leveling treatment should be conducted. In this case, when the height of recesses and projections is large, it is necessary to conduct the leveling treatment several times to reduce the height of the recesses and projections.

It is necessary to laminate a leveling layer to perform the leveling. However, it is also necessary to laminate a leveling layer for the color filter 40. However, in the structure formed by laminating the color filter 40 and the diffusion reflection layer 51 as shown in FIG. 6, it is enough to laminate the leveling layer onto either one, and accordingly, manufacturing steps can be simplified.

Further, in the same manner as the reflection layer 50 in Example 1, it is also possible to use the diffusion reflection layer 51 as an electrode layer. However, since an electrode has to be drawn out of the cell, the diffusion reflection layer 51 has to be drawn out of the cell in such structure. Then, there arises a problem of reliability on the diffusion reflection layer 51. In this example, the diffusion reflection layer 51 is not used as an electrode layer, and a structure that the diffusion reflection layer does not extend from the liquid crystal cell is used. However, in order to increase the surface area of the diffusion reflection layer 51, it may be extended to the underneath of the cell sealing portion.

As shown in Table 1, a personal evaluation was conducted in this Example. As a result, a light attractive display could be obtained in either case of parallel light incidence or diffusion light incidence.

EXAMPLE 3

Figure 7:
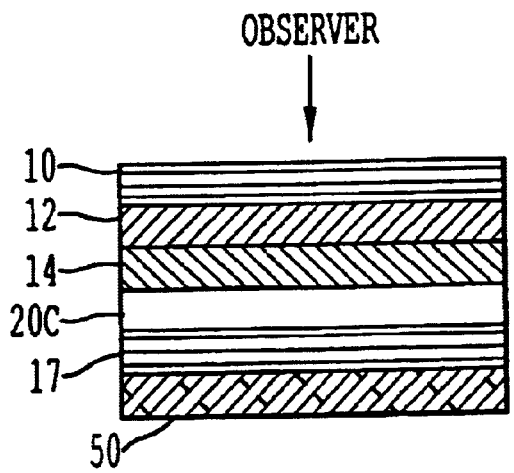
FIG. 7 is a cross-sectional view showing the structure of another embodiment of the liquid crystal display element according to the present invention.

In this Example, the reflector was disposed at an outer side of the polarizer. Namely, as shown in FIG. 7, the liquid crystal element has a structure formed by laminating, from an observer side, a polarizer 10, retardation plates 12, 14, a liquid crystal panel 20C, a polarizer 17 and a reflector 50.

Figure 8:
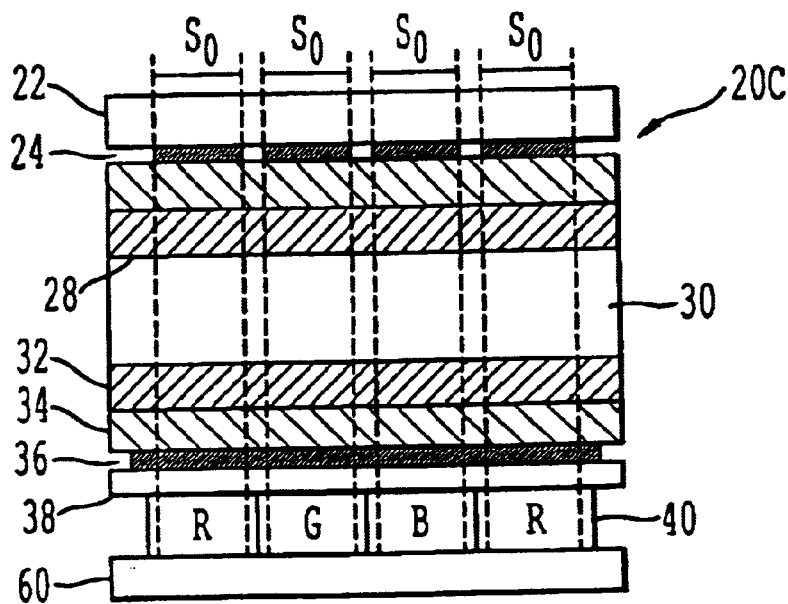
FIG. 8 is a cross-sectional view showing the structure of a liquid crystal panel.
Figure 9:
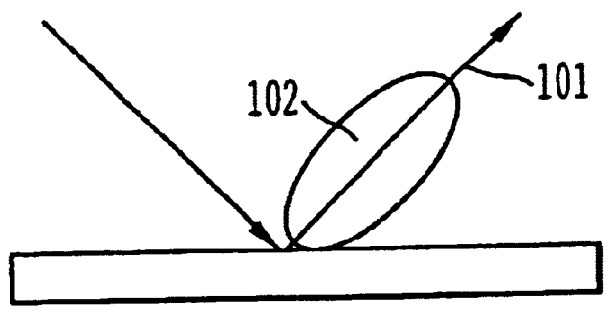
FIG. 9 is a diagram showing a reflection characteristic of a conventionally used reflector.
Figure 10:
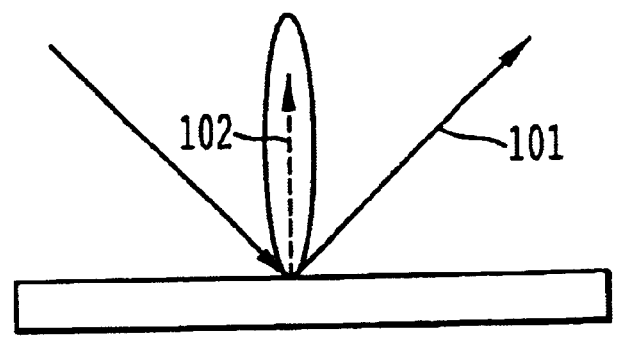
FIG. 10 is a diagram showing a reflection characteristic of a reflector used in the present invention.

As shown in FIG. 8, the liquid crystal panel 20C has a structure formed by laminating an upper glass substrate 22, an upper electrode layer 24, an insulating layer 26, an upper alignment layer 28, a liquid crystal layer 30 filled between the alignment layer 28 and a lower alignment layer 32, an insulation layer 34 disposed below the alignment layer 32, a lower electrode layer 36, a smoothing layer 38, a color filter 40 and a lower glass substrate 60.

Relations of each member are as follows. An angle in a counterclockwise direction from an absorbing axis of the polarizer 10 to a retardation axis of the retardation plate 12 is 35°, and an angle in a counterclockwise direction from the retardation axis of the retardation plate 12 to a retardation axis of the retardation plate 14 is 48°. An angle in a counterclockwise direction from the retardation axis of the retardation plate 14 to an alignment direction in an upper face of the liquid crystal cell (including the alignment layer 28, the liquid crystal layer 30 and the alignment layer 32) is 108°. An angle in a counterclockwise direction from the alignment direction in the upper face to an alignment direction in a lower face of the liquid crystal cell is 240°. An angle from the alignment direction in the lower face of the liquid crystal cell to an absorbing axis of the polarizer 17 is 45°.

The retardation values of the retardation plate 12, the retardation plate 14 and the liquid crystal cell were respectively 435 nm, 435 nm and 850 nm. The color filter 40 is the same in construction as that used in Example 1.

As shown in Table 1, a personal evaluation was conducted in this Example. As a result, a light attractive display could be obtained in either case of parallel light incidence or diffusion light incidence.

In Examples 1 to 3, two retardation plates 12, 14 are used. However, three or more retardation plates may be used. Further, in the reflection characteristic of the reflector conventionally used, a direction of regular reflection 101 coincides with a direction of the brightness at the peak 102. In using the reflector 50, when the directivity is controlled so that the direction of the brightness at the peak 102 coincides with a direction of a normal line, which is different in angle from the direction of regular reflection 101, a further preferable result can be obtained.

EXAMPLE 4

In Examples 1 to 3, the color filter 40 wherein colored portions of R, G and B adjoin without any gap is used. However, a color filter 41 wherein a mixed color portion is arranged between adjacent colored portions R, G and B and wherein the mixed color portion is formed by mixing the colors of the adjacent colored portions, may be used as shown in FIG. 11. In definition, the surface area $S_{cf}$ of each of the colored portions in the color filter 41 is the surface area of each portion excluding each mixed color portion 211, 212, 213, 214, i.e., the surface area of a colored portion of single color as shown in FIG. 11. Each of the mixed color portions includes two or three colors among R, G and B. Since the lightness of the mixed color portions is darker than the lightness of the portions of single color, the mixed color portions perform a function similar to a black mask.

Further, the surface area $S_o$ of a pixel of the driving aperture is smaller than $S_{cf}$ as shown in FIG. 12. Namely, the surface area of a portion which is not lit (the surface area of a portion where an upper electrode does not overlap with a lower electrode), i.e., the surface area of an interline portion is larger than the surface area of a mixed color portion. A color filter in which the surface are of a mixed color portion is zero corresponds to the color filter 40 used in Examples 1 to 3.

In a reflective type liquid crystal display element, a normally white mode is utilized wherein a high degree of brightness is realized at the time of applying no voltage and the brightness is decreased with the application of a voltage in order to increase utilization of light. However, when the color filter 41 having such structure is used, color reproducibility is decreased due to leakage of light from interline portions. In order to suppress the leakage of light and assure a good attractive display, it is preferable to use a normally black mode rather than the normally white mode in this Example. This is also applicable similarly to Examples 1 to 3 using the color filter 40.

FIG. 12A is a plan view showing the driving aperture, FIG. 12B is a plan view of the color filter 41 viewed from an upper portion, and FIG. 12C is a plan view showing a state of overlapping of the driving aperture and the color filter 41.

In the liquid crystal display element in Examples 1 to 3, even when the color filter 41 shown in FIG. 11 was used instead of the color filter 40, a light attractive display could be obtained in a personal evaluation.

Further, a color filter 42 having a black mask 210 shown in FIG. 13 may be used. In definition with respect to FIG. 13, the surface area $S_{cf}$ of each of the colored portions in the color filter 42 is the surface area of a portion excluding the black mask 210, i.e., the surface area of a portion of single color. Further, the surface area $S_o$ of a pixel in the driving aperture is smaller than $S_{cf}$ as shown in FIG. 14. Namely, the surface area of a portion which is not lit, i.e., the surface area of an interline portion is larger than the surface area of the black mask 210.

Even in a case that the color filter 42 having the above-mentioned structure is used, color reproducibility is reduced due to leakage of light from interline portions. In order to suppress the leakage of light and assure a good attractive display, it is preferable to use the device with a negative mode rather than a positive mode in this Example.

FIG. 14A is a plan view showing a driving aperture, FIG. 14B is a plan view of the color filter 42 viewed from an upper portion, and FIG. 14C is a plan view showing a state of overlapping of the driving aperture and the color filter 42.

In the liquid crystal display element used in Examples 1 to 3, even when the color filter 42 as shown in FIG. 13 was used for the color filter 40, a good display could be obtained in a personal evaluation.

EXAMPLE 5

A liquid crystal display element having the same structure as in Examples 1 to 4 was prepared except that a normally white mode was used. In such structure, a good display was obtained in a personal evaluation. In use of the normally white mode, a particularly good result was obtained in a case of using the color filter 42 shown in FIG. 13. The result shown in Table 1 was obtained when the structure used in Example 1 in which the color filter 42 was applied was used.

COMPARATIVE EXAMPLE 1

Measurement of the color surface, the lightness and so on was conducted with use of a transmission type liquid crystal display device. In the transmission type liquid crystal display device, attractivity decreases as an outer light becomes brighter. As shown in Table 1, transmitted light was incident at an inclination of 20° or 30° with respect to a normal line to the panel under illumination of a luminance of 1390 Lx or 8380 Lx. Values of the lightness shown in Table 1 are such values obtainable when the brightness of a magnesia oxide material under illuminances of 1390 Lx or 8380 Lx was determined to be 100%.

As shown in Table 1, the lightness and the color surface remarkably reduce as the illuminance of an outer light becomes high. The measurement was conducted in a dark room with use of illumination light of low brightness. However, the lightness and the color surface area further decrease under the condition of a further high brightness such as outdoors in a fine weather. Further, measurement was conducted even in a state that there was no illuminance by an outer light in a dark room. In a result of measurement, the contrast ratio=16.9 and the color surface area=0.0412.

On the other hand, in Examples 1 to 4, it was confirmed that attractivity was improved as an outer light became bright. Accordingly, the liquid crystal display element of the present invention is suitable for a reflective type liquid crystal display element.

Figure 15:
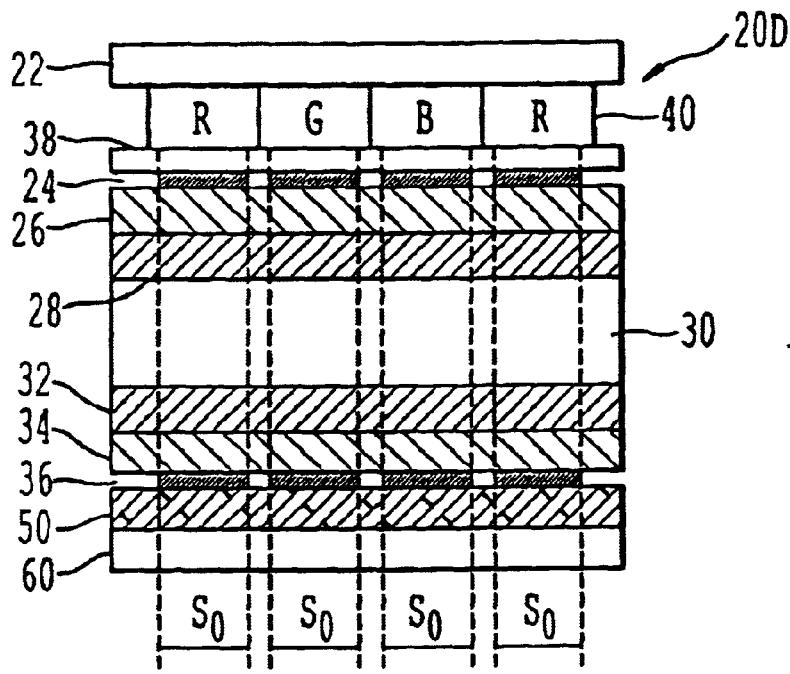
FIG. 15 is a cross-sectional view showing the structure of a liquid crystal pane in a case that a color filter is provided at a front face of a liquid crystal layer.
Figure 16:
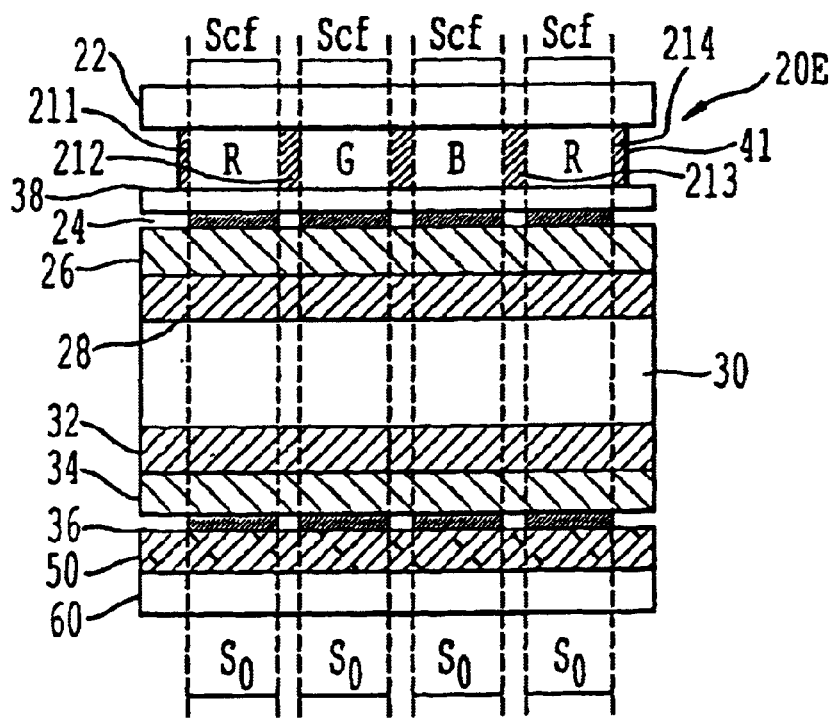
FIG. 16 is a cross-sectional view showing the structure of another embodiment of the liquid crystal panel in a case that a color filter is provided at a front face of a liquid crystal layer.

In the above-mentioned Examples, each of the color filters 40, 41, 42 was disposed below the liquid crystal panel. However, the order of lamination may be reversed as illustrated in FIGS. 15 and 16. The structure shown in FIG. 15 is an example of using the color filter 40 wherein colored portions of R, G and B adjoin without any gap, and the structure shown in FIG. 16 is an example of using the color filter 41 having mixed color portions 211, 212, 213 and 214.

In each of the above-mentioned examples, a color filter used in a transmission type liquid crystal display panel is used wherein the color purity is lowered to thereby improve the transmittance of light through the color filter 40, 41 or 42 is improved, and the surface area $S_{cf}$ of colored portions having a single color of the color filter 40, 41 or 42 is made larger than the surface area $S_o$ of the driving apertures of the liquid crystal cell to thereby improve the lightness.

In Examples 1 to 3, since the colored portions of R, G and B of the color filter 40 adjoin without any gap, there is no possibility that light passing through non-driving portions is out the colored portions. Further, in Example 4, since there is a mixed color portion 211, 212 or 213 between colored portions of single color in the color filter 41, there is no possibility that light passing through the non-driving portions is out the colored portions. In examples 4 and 5, since the color filter 42 has the black mask 210, there is no possibility that light passing through the non-driving portions is out the colored portions.

Further, in each of the above-mentioned Examples, the color filters 40, 41, 42 are so designed that light from the standard C light source becomes achromatic when three colors are mixed. Namely, they have color reproducibility different from the color filter used in the conventional transmission type liquid crystal display device. Accordingly, when they are applied to a reflective type liquid crystal display device, color development of high quality can be obtained.

In each of the above-mentioned Examples, the reflective type liquid crystal display panel without using a backlight was used. However, a transflector may be used for the reflector 50 to constitute a semi-transparent type liquid crystal display panel having a backlight. In a case of using the structure shown in Examples 1 or 2, the reflector 50 is replaced by a transflector, and a ¼ wavelength plate and a polarizer are disposed below the transflector. In this case, a retardation axis of the ¼ wavelength plate should be shifted by 45° with respect to a polarizing axis of the polarizer. Incident light to the liquid crystal layer is not limited as far as it provides a circularly polarized light. A selective reflection performance of a choresteric liquid crystal may be utilized for the retardation axis of the ¼ wavelength plate and the polarizer. Further, a backlight may be disposed below it to thereby form a semi-transparent type liquid crystal display panel. In a case of using the structure shown in Example 3, only the reflector 50 is replaced by a transflector. In this case, a backlight may be disposed at a lower portion.

EXAMPLE 6

A transflector was disposed, instead of a reflector, at a rear side of a liquid crystal display element (hereinbelow, referred to as a panel) and a backlight of a fluorescent tube was disposed at a rear surface of it to thereby constitute a liquid crystal display device.

Figure 17:
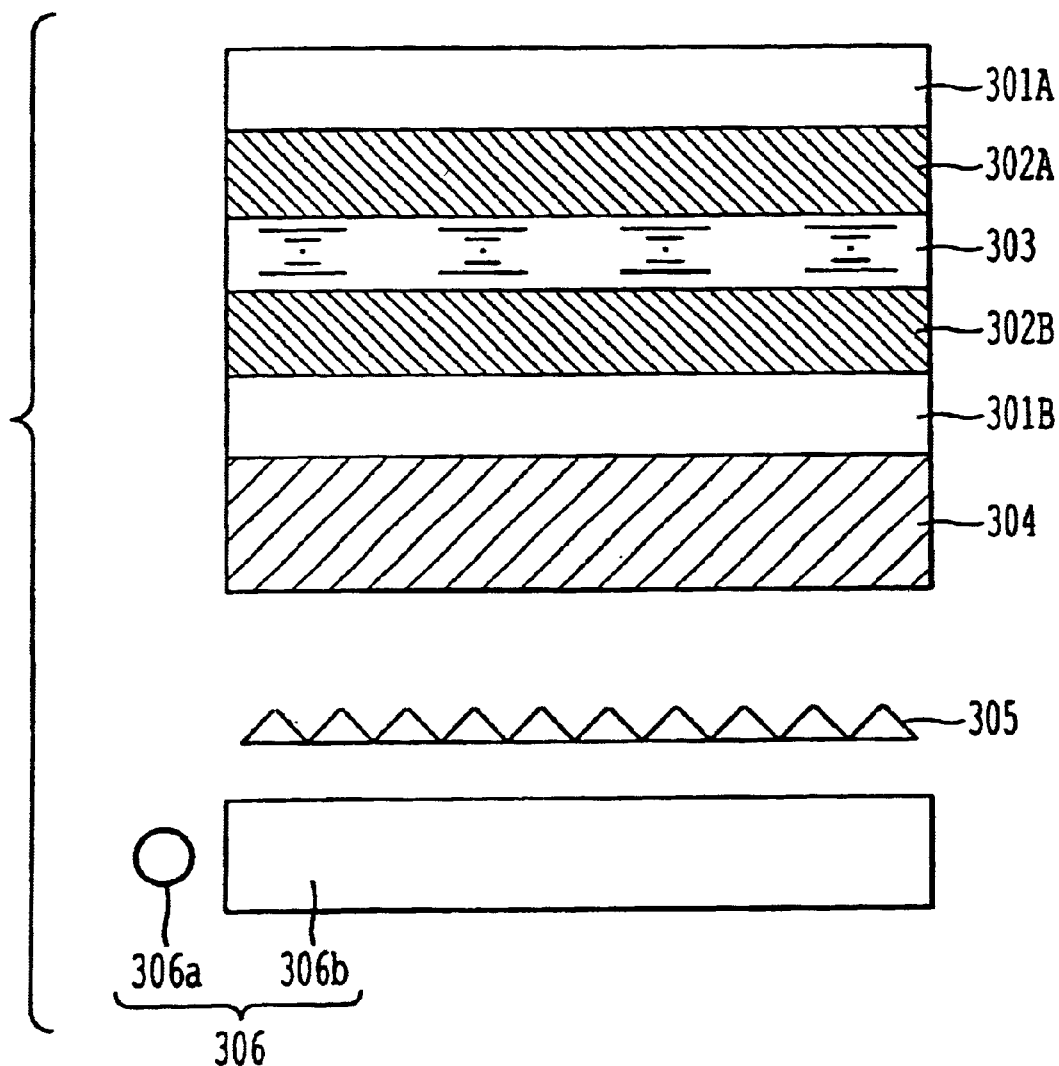
FIG. 17 is a cross-sectional view showing the structure of an embodiment of the color display device of the present invention.
Figure 18:
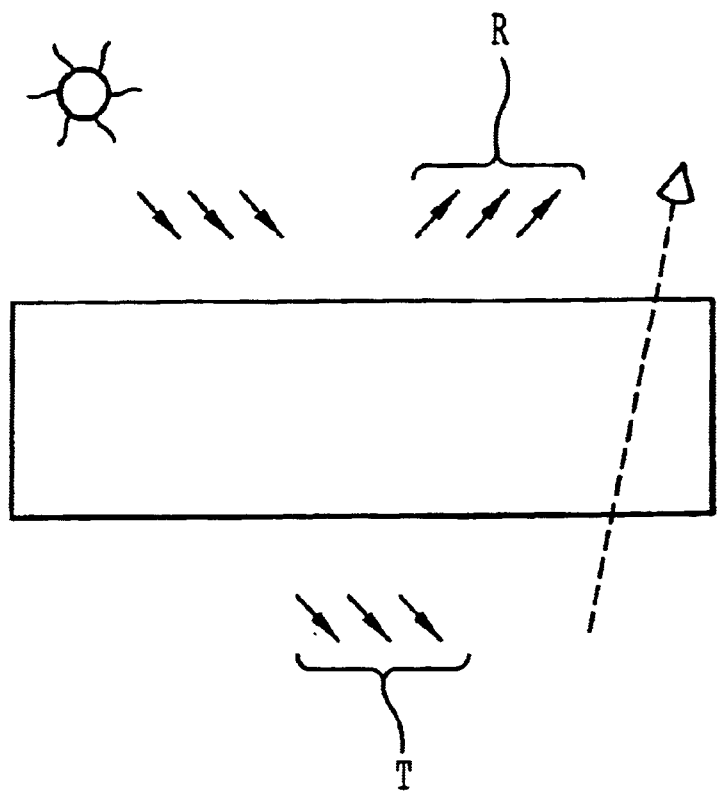
FIG. 18 is a diagram of light path in a transflector.

FIG. 17 shows the structure in cross section of the liquid crystal display device wherein a polarizer 301A, a retardation plate 302A, a color liquid crystal panel 303 (a color filter is on an inner surface of the panel at a side of an observer), a retardation film 302B, a polarizer 301B, a transflector 304, a prism sheet 305 and a backlight 306 were arranged in this order in view from a side of the observer. As the backlight 306, a light guide plate 306b and a side light type light source 306a were disposed. Antireflection coating and antiglare coating were conducted on a front surface of the polarizer. In this Example, two retardation plates (films) were disposed at both sides of the panel. However, it may be disposed at only a single side.

The color filter used was such one that the thickness of a transparent type color filter was made thin. The transmittance Y of visible light by the standard C light source was 40%. On the transflector used, the transmittance was 26% and reflectance was 74%. Further, the gain at the reflection was 2.

The backlight was adjusted so that the brightness on white of the liquid crystal display device in a dark room was 20 cd/m². Consumption power of the liquid crystal display device as a whole at this time was about 200 mW.

The liquid crystal display device was moved to a dark room, a room (400 Lx), a light room (1000 Lx) and the outdoors (15000 Lx) respectively, and displayed pictures were observed. As a result, good attractive displays were obtained on a display showing a sentence, a colored image and so on. A result is shown in Table 2. In Table, negative indicates a normally black mode and positive indicates a normally white mode.

EXAMPLES 7 to 12

In the same manner as Examples 6, a liquid crystal display device was manufactured. A display of each Example under the same condition as in Example 6 was observed by changing the characteristics and the presence or absence of the transflector and the characteristics of the color filter. In Example 8, comparison was made about a case that the backlight was usually operated and a case that a control system was added so that it was operated in a standard environment (300 Lx) or lower and it was not operated in an environment higher than the standard environment.

Figure 19:
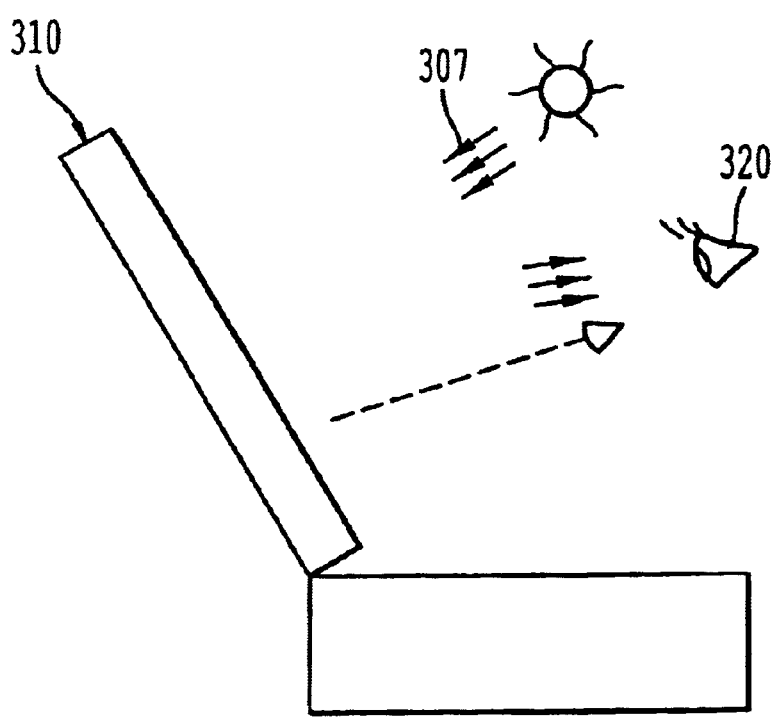
FIG. 19 is a diagram showing how the color display device of the present invention is used.

With the basic structure that reflected light was used dominantly, a display of high visibility was obtained in either case. In Example 10, the liquid crystal display device as in Example 6 was used wherein the backlight was not operated only in the outdoors (10000 Lx or higher) and it was operated in the environment other than the above. As a result, an attractive display having a high visibility could be obtained. In Example 10, MLA driving method wherein 4 lines were simultaneously selected was used. The color liquid crystal display device capable of responding to a change of visual environment such as in the room or the outdoors and a change of temperature, could be obtained (refer to FIG. 19. In Figure, 320 indicates a viewer, 310 indicates a color liquid crystal display device and 307 indicates an outer light). A result of each of the Examples is shown in Table 2. Examples 11 and 12 are Comparative Examples.

TABLE 2

| Item\Example | Example 6 | Example 7 | Example 8 | Example 9 | Example 10 | Example 11 | Example 12 |
|---|---|---|---|---|---|---|---|
| Display mode | STN Negative | STN Negative | STN Negative | TFT-TN Positive | STN Negative | STN Negative | STN Negative |
| R (%) | 74 | 80 | 67 | 74 | 74 | 100 | 0 |
| T (%) | 26 | 20 | 33 | 26 | 26 | 0 | 100 |
| Y (%) | 40 | 35 | 50 | 40 | 40 | 30 | 60 |
| Brightness on white in dark room (cd/m²) | 20 | 5 | 10 | 20 | — | 100 | 0 |
| Observation in dark room | ◉ | ◉ | ◉ | ◉ | — | ◉ | x |
| In room | ◉ | ○ | ◉ | ◉ | ◉ | ◉ | Δ |
| In light room | ◉ | ◉ | ◉ | ◉ | — | ◉ | ○ |
| Outdoor | ◉ | ◉ | ◉ | ◉ | — | x | ◉ |
| Consumption power (mW) | 200 | 90 | 50 | 350 | 200 | 900 | 50 |

Remark Symbol
◉: Excellent,
○: Good,
Δ: Average,
x: No good
Consumption power
Average consumption power in operating a backlight to effect a color display.

As described above, in a liquid crystal display element comprising a color filter having a-plurality of colored portions each having a different spectral color and a reflector, the color filter is so constructed that transmitted light from a standard C light source is substantially achromatic, and the transmittance of visible light by the standard C light source is 30–65%.

Accordingly, there is obtainable a liquid crystal display device usable for regular portable information devices in either case of using a specified light source such as a backlight or a case without using it, and capable of improving the brightness while excellent color development performance is maintained.

Further, since the liquid crystal display element allows to light to pass therethrough at the time of applying a voltage, and is so formed that a color portion having a spectral color of the color filter covers a pixel of a driving aperture wherein the pixel corresponds to the colored portion having a spectral color of the color filter, a lighter display can be obtained.

Further, in a color display device comprising the display element with the color filter and a backlight, a transflector is disposed between the display element and the backlight, the transmittance of visible light by the standard C light source, of the color filter is 30–65%, and the transmittance T(%) and the reflectance R(%) of the transflector satisfy the before-mentioned Formula 1 whereby a liquid crystal display device usable under various conditions of lightness can be obtained.

Further, steps of forming a reflecting layer on a glass substrate and laminating a color filter on the reflecting layer are provided wherein the color filter is laminated so that a colored portion having a spectral color of the color filter covers a pixel of a driving aperture, which corresponds to the colored portion having a spectral color of the color filter. Accordingly, the color filter and the reflecting layer can be gathered at a side of an electrode layer, and a driving IC can be connected to an electrode layer which is at a side apart from the color filter and the reflecting layer. As a result, the color filter and the reflecting layer can be prevented from suffering a high temperature in manufacturing steps, whereby a liquid crystal display element having a high quality which is suitable for a reflective type liquid crystal display device can be manufactured.

What is claimed is:

1. A color display device, comprising a display element having a color filter, a back light, and a transreflector disposed between the display element and the back light wherein the transmittance to visible light by a standard C light source of the filter is from 30 to less than 50%, and the transmittance, T%, and the reflectance, R%, of the transreflector satisfy Formula 1:

$$T/(T+R) \leq 0.4 \qquad \text{(Formula 1).}$$

2. The liquid crystal display element according to claim 1, wherein the color filter is adapted so that transmitted light from the standard C light source is substantially achromatic.

3. The liquid crystal display element according to claim 1, wherein the brightness of transmitted light emitted from the back light as a light source through the transflector to be emitted toward its front surface side is 120 cd/m² or less.

4. The liquid crystal display element according to claim 1, wherein the transflector has the directivity of a gain of 1.5–10 as luminous intensity distribution characteristics of reflected light.

5. The liquid crystal display element according to claim 1, wherein the color filter has a plurality of colored portions each having a different spectral color and a colored portion having a spectral color of the color filter is formed to cover a pixel of a driving aperture, which corresponds to said colored portion having a spectral color of the color filter.

6. The liquid crystal display element according to claim 5, wherein the colored portions each having a spectral color to constitute the color filter are arranged to adjoin without any gap.

7. The liquid crystal display element according to claim 5, wherein there is a mixed color portion between adjacent colored portions each having a spectral color to constitute the color filter.

8. The liquid crystal display element according to claim 5, wherein there is a black mask between adjacent colored portions each having a spectral color to constitute the color filter.

9. The liquid crystal display element according to claim 1, wherein said display device transmits light at the time of applying a voltage.

10. The liquid crystal display element according to claim 1, wherein said display element is a STN type liquid crystal display element having a twist angle of 180–600°.

11. The liquid crystal display element according to claim 1, wherein said display element is driven by a multiplex line addressing method wherein at least two lines are simultaneously scanned.

* * * * *